(12) United States Patent
Duhaime et al.

(10) Patent No.: US 9,109,674 B2
(45) Date of Patent: Aug. 18, 2015

(54) ENHANCED ELECTRICALLY VARIABLE DRIVE UNIT

(71) Applicants: Michael L Duhaime, Northville, MI (US); Scott A Miller, Northville, MI (US); Dumitru Puiu, Sterling Heights, MI (US)

(72) Inventors: Michael L Duhaime, Northville, MI (US); Scott A Miller, Northville, MI (US); Dumitru Puiu, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/053,215

(22) Filed: Oct. 14, 2013

(65) Prior Publication Data

US 2015/0105200 A1    Apr. 16, 2015

(51) Int. Cl.
*F16H 3/72*    (2006.01)

(52) U.S. Cl.
CPC ..................... *F16H 3/725* (2013.01)

(58) Field of Classification Search
CPC ....................................... F16H 3/725
USPC ............................ 475/5, 154, 331, 153; 477/5
See application file for complete search history.

(56) References Cited

U.S. PATENT DOCUMENTS

| | | | |
|---|---|---|---|
| 5,558,595 A | 9/1996 | Schmidt et al. | |
| 5,730,676 A * | 3/1998 | Schmidt | 475/5 |
| 8,066,609 B2 | 11/2011 | Kersting | |
| 8,382,623 B2 | 2/2013 | Puiu | |
| 8,444,516 B2 | 5/2013 | Tamai et al. | |
| 8,527,130 B2 * | 9/2013 | Kitahata et al. | 701/22 |
| 2005/0272556 A1 | 12/2005 | Hiroe et al. | |
| 2010/0222171 A1 * | 9/2010 | Tabata et al. | 475/5 |
| 2010/0331130 A1 * | 12/2010 | Tsyganov | 475/5 |
| 2011/0143875 A1 * | 6/2011 | Ono et al. | 475/5 |
| 2012/0065014 A1 | 3/2012 | Puiu et al. | |
| 2012/0065015 A1 | 3/2012 | Tamai et al. | |
| 2012/0244992 A1 * | 9/2012 | Hisada et al. | 477/5 |
| 2012/0270698 A1 * | 10/2012 | Hisada et al. | 477/5 |
| 2012/0277059 A1 * | 11/2012 | Akutsu et al. | 477/5 |
| 2013/0017916 A1 | 1/2013 | Sada et al. | |

FOREIGN PATENT DOCUMENTS

WO    2013094076 A1    6/2013

OTHER PUBLICATIONS

International Search Report and Written Opinion dated Apr. 1, 2015 for International Application No. PCT/US2014/059597, International Filing Date Oct. 8, 2014.

\* cited by examiner

*Primary Examiner* — Ramya Burgess
*Assistant Examiner* — David J Hlavka
(74) *Attorney, Agent, or Firm* — Ralph E Smith

(57) ABSTRACT

An electrically variable transmission includes an input member, first and second motor-generators and a gear reduction arrangement including at least a first gear coupled to at least one second gear. A first planetary gear set can include a first sun gear, a first ring gear and a first carrier rotatably supporting a plurality of pinion gears in meshing engagement with the first sun gear and ring gear. The first carrier can be non-rotatably coupled to the input member and the first ring gear can be non-rotatably coupled to the at least one second gear. The sun gear can be non-rotatably coupled to the first motor-generator and the first gear can be non-rotatably coupled to the second motor-generator. The torque transmitting device can be configured to selectively fix rotation of the input member in at least one of a first rotational direction and a second opposite rotational direction.

15 Claims, 4 Drawing Sheets

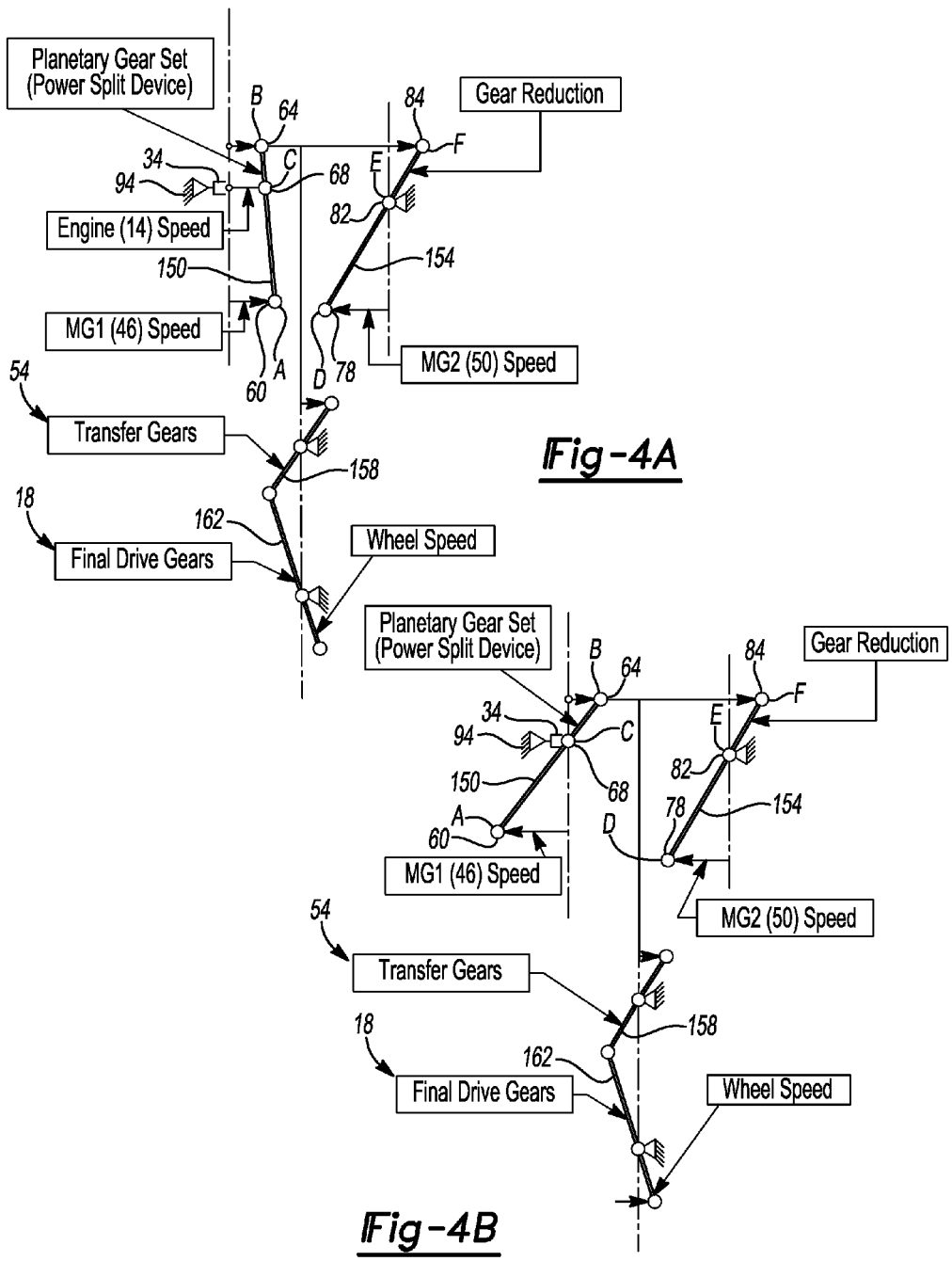

ENHANCED ELECTRICALLY VARIABLE DRIVE UNIT

FIELD

The present disclosure relates generally to a transmission for a motor vehicle and, more particularly, to an electrically variable transmission for a hybrid electric vehicle.

BACKGROUND

A power split transmission is one type of transmission used for hybrid electric vehicles (HEV). Power split transmissions can utilize two electric motors ("e-motors") and can utilize epicyclic differential gearing (i.e., planetary gear sets) in a way that transmits part of the power of an internal combustion engine through a mechanical path to the output, and transmits another part on an electrical path. The electrical path typically includes the two e-motors, where one of them operates as a motor and the other as a generator. By varying the speeds of the e-motors, variable transmission ratios for transmitting engine power to ground can be obtained. Such a transmission arrangement can be referred to as an electrically variable transmission (EVT), as is known to one of ordinary skill in the art. The EVT can include different operating modes, such as electric-only, engine-only (fixed gears, also referred to as mechanical points), and an electrically variable mode. A single mode EVT, when operating in the electric-only mode, can typically use only one e-motor as a traction motor. Thus, while such conventional single mode EVTs work for their intended purpose, there remains a need for improvement in the relevant art.

SUMMARY

In one form, an electrically variable transmission is provided in accordance with the teachings of the present disclosure. The electrically variable transmission can include an input member, first and second motor-generators, a gear reduction arrangement, a first planetary gear set and a torque transmitting device. The gear reduction arrangement can include at least a first gear member that can be coupled to at least one second gear member, where the first gear member can also be coupled to the second motor-generator for common rotation therewith. The first planetary gear set can include a first sun gear member, a first ring gear member and a first carrier member that can rotatably support a plurality of pinion gears that can be in meshing engagement with the first sun gear member and the first ring gear member. The first sun gear member can be coupled to the first motor-generator for common rotation therewith and the first carrier member can be coupled to the input member for common rotation therewith. The first ring gear member can be coupled to the at least one second gear member of the gear reduction arrangement. The torque transmitting device can be configured to selectively fix or ground rotation of the input member in at least one of a first rotational direction and a second opposite rotational direction.

In another form, an electrically variable transmission is provided in accordance with the teachings of the present disclosure. The electrically variable transmission can include an input member, first and second motor-generators, first and second planetary gear sets and a torque transmitting device. The first planetary gear set can include a first sun gear member, a first ring gear member and a first carrier member that can rotatably support a plurality of pinion gears that can be in meshing engagement with the first sun gear member and the first ring gear member. The first sun gear member can be coupled to the first motor-generator for common rotation therewith and the first carrier member can be coupled to the input member for common rotation therewith. The second planetary gear set can include a second sun gear member, a second ring gear member and a second carrier member that can rotatably support a plurality of pinion gears that can be in meshing engagement with the second sun gear member and the second ring gear member. The second sun gear member can be coupled to the second electric motor-generator for common rotation therewith. The second carrier member can be coupled to the first ring gear member for common rotation therewith and the second ring gear member can be grounded to a stationary member. The torque transmitting device can be configured to selectively ground the input member to a stationary member thereby selectively providing reaction torque to the first motor-generator.

In various forms, the torque transmitting device can include a selectively engagable clutch brake configured to ground the input member to the stationary member. In some forms, the clutch brake can be positioned about a first side of the first motor-generator and first planetary gear set, and an output member can be positioned about a second opposite side of the first motor-generator between the first motor-generator and planetary gear set and the second motor-generator and planetary gear set.

In some implementations, the clutch brake can be selectively engaged in an electric drive mode of the EVT such that the input member can be grounded and the first motor-generator can provide driving torque to assist the second-motor generator in the electric drive mode. The first motor-generator can also function as a generator to aid the second motor-generator with regenerative braking. In some implementations, the clutch brake can comprise a friction clutch that can be selectively slipped to slow down rotation of the engine adapted to be coupled to the input member before grounding the input member.

In various implementations, the EVT can include only a single torque transmitting device, such as a controlled clutch brake. In other implementations, the torque transmitting device can be a one-way clutch. In some implementations, the torque transmitting device can be a mechanical diode one-way clutch.

In some implementations, the first gear member of the gear reduction arrangement can be directly coupled to the second motor-generator with a first layshaft and the second gear member of the gear reduction arrangement can be directly coupled to the first ring gear with a second layshaft, where the first and second gear members can be in constant meshing engagement.

In some implementations, the gear reduction arrangement can be a first gear reduction and transfer arrangement with the first gear member being directly coupled to the second motor-generator with a first layshaft and the second gear member can form part of a transfer gear set that can be coupled to a final drive gear via a transfer shaft.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or

BRIEF DESCRIPTION OF THE DRAWINGS

FIGS. 4A and 4B are schematic illustrations depicted in lever diagram form of an exemplary electrically variable transmission coupled to the engine and having the selectively engagable torque transmitting device according to the principles of the present disclosure.

DESCRIPTION

Figure 1:
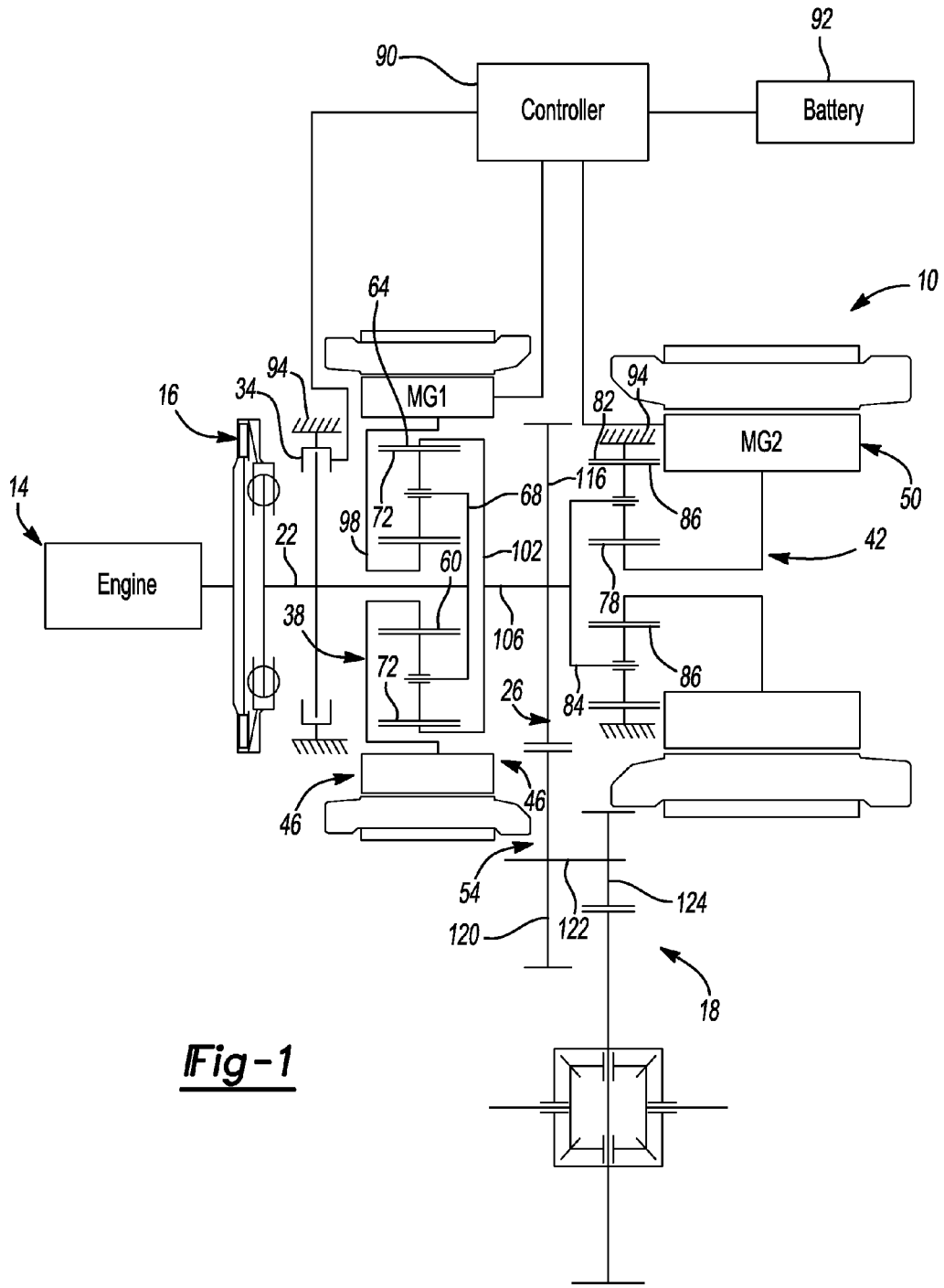
FIG. 1 is a schematic illustration of an exemplary electrically variable transmission coupled to an engine and having a selectively engagable torque transmitting device according to the principles of the present disclosure.

Referring now to the drawings, where like reference numerals refer to like components or features, FIG. 1 shows one example of an electrically variable transmission (EVT) designated generally by reference numeral 10. The EVT 10 can be coupled to a prime mover, such as an engine 14, a torsional vibration damper 16 and a final drive 18. In the example configuration shown in FIG. 1, the engine 14 can include an output shaft that can serve as an input 22 to the EVT 10. An output 26 of the EVT 10 can be coupled to the final drive 18 to deliver driving power to the wheels of an associated vehicle. As will be discussed in greater detail below, EVT 10 is represented in lever diagram form in FIGS. 4A and 4B, as will be readily understood by those skilled in the art.

Continuing with reference to FIG. 1, EVT 10 can include a selectively engagable torque transmitting device 34, such as an input brake or clutch brake, a friction clutch, a wet clutch, a one-way clutch, or combinations thereof. The EVT 10, in the exemplary configuration shown, can include a selectively engagable controlled clutch brake 34. The EVT 10 can also include a first differential gear set 38, a second differential gear set 42, a first electric motor-generator (e-motor) 46, a second e-motor 50, and a transfer gear arrangement 54. In the exemplary configuration shown in FIG. 1, the first planetary gear set 38 can be a power split gear set and the second planetary gear set 42 can provide gear reduction, as can be appreciated by those skilled in the art. In this regard, it will also be appreciated that various gear reduction configurations other than a planetary gear set can be employed for the purposes of gear reduction, as will be discussed below by way of example with reference to FIGS. 2 and 3.

As will also be discussed in greater detail below, EVT 10 together with the controlled clutch brake 34 can provide for or enable both e-motors 46, 50 to provide propulsive force when operating in an electric-drive or electric vehicle (EV) mode. This is in contrast to typical single mode EVTs without an input brake, where only one electric motor can be utilized as a traction motor to provide propulsive force in the EV mode. The capability to use both e-motors 46, 50 in EV mode can provide operating efficiencies and expanded operating capabilities. For example, the capability to use both e-motors 46, 50 in the EV mode provides an ability to spread the load between the two e-motors 46, 50, which can reduce operating temperatures of the e-motors 46, 50. As an example of expanded operating capabilities, using both e-motors 46, 50 to provide propulsive force can enable EV capability to launch the vehicle, especially on a grade, where typical single mode EVTs without an input brake would require propulsive force from the engine since only one electric motor can be providing propulsive force and a reserve is necessary to protect for starting the engine.

In FIG. 1, the first and second differential gear sets 38, 42 are shown as first and second simple planetary gear sets 38, 42. Those skilled in the art will readily appreciate that the first planetary gear set 38 can include a sun gear member 60, a first ring gear member 64 and a first carrier member 68 that rotatably supports a plurality of first pinion gears 72 in meshing engagement with both the first sun gear member 60 and the first ring gear member 64. Similarly, the second planetary gear set 42 can include a second sun gear member 78, a second ring gear member 82 and a second carrier member 84 that rotatably supports a plurality of second pinion gears 86 in meshing engagement with both the second sun gear member 78 and the second ring gear member 82.

In the exemplary implementation shown in FIG. 1, an output of engine 14 can be coupled to first carrier member 68 via the input member 22 for common rotation therewith. In this implementation, the output of the engine 14 can be coupled to the torsional vibration damper 16, which can include a torque limiting device. As discussed above, the controlled clutch brake can be configured to selectively engage the input member 22. As also discussed above, the controlled clutch brake 34 is one example or various torque transmitting devices and/or input brakes that can be used to selectively ground or fix rotation of input member 22. The controlled clutch brake 34 can be in communication with a controller 90 associated with e-motors 46 and 50 and one or more batteries 92. In one exemplary implementation, the controlled clutch brake 34 can selectively ground input member 22 to a stationary member 94, such as a transmission housing (not shown) of EVT 10. As can be appreciated by those skilled in the art, grounding input member 22 will in turn ground engine 14.

The first sun gear member 60 can be continuously non-rotatably coupled to first e-motor 46 via a shaft or connecting member 98 for common rotation therewith. The first ring gear member 64 can be continuously non-rotatably coupled to the second planetary gear set 42 via a bell portion 102 and an interconnecting member or layshaft 106 for common rotation therewith. In particular, the first ring gear member 64 can be continuously non-rotatably connected to the second carrier member 84 of second planetary gear set 42. The plurality of second pinion gears 86 can be in continuous meshing engagement with the second ring gear member 82, which can be grounded to a stationary member, such as the housing of EVT 10. The plurality of second pinion gears 86 can also be in continuous meshing engagement with second sun gear member 78, which can be continuously non-rotatably coupled to second e-motor 50 for common rotation therewith, as shown in FIG. 1.

The transfer gear arrangement 54 can couple an output of the EVT 10 to the final drive 18. For example, and with continued reference to FIG. 1, an output gear 116 can be continuously non-rotatably coupled to the interconnecting member 106 for common rotation therewith and can be in continuous meshing engagement with a transfer gear 120. Transfer gear 120 can be in continuous meshing engagement with output gear 116. A transfer shaft 122 can non-rotatably couple transfer gear 120 to a final drive gear 124. It should be appreciated that while transfer gear arrangement 54 is discussed above as having various gears and shafts 116, 120 and 122, more or less gears can be utilized depending on, for example, packaging considerations of the associated vehicle.

In the example configuration illustrated in FIG. 1, the first e-motor 46 and first planetary gear set 38 can be concentric with input member 22. In this exemplary implementation, the second e-motor 50 and second planetary gear set 42 can also be concentrically aligned with input member 22. In addition, while various configurations can be utilized, the connecting member 98 associated with sun gear member 60 can be positioned on a first side of first planetary gear set 38 facing engine 14, and the bell portion 102 associated with first ring gear member 64 can be positioned on a second opposed side of first planetary gear set 38. In this exemplary configuration, the output gear 116 can be positioned between the first and second e-motors 46, 50 and the first and second planetary gear sets 38, 42 thereby providing a compact EVT 10 from a length perspective.

As briefly discussed above, EVT 10 with only one controlled clutch brake 34 can combine the simplicity of a single mode EVT with the capability of a two mode EVT in electric drive mode. For example, EVT 10 is capable of launching the vehicle with the engine running or the engine off, where both e-motors 46, 50 can be utilized to launch the vehicle and provide forward and reverse propulsion with controlled input brake 34 engaged to ground input member 22. Whereas, in a conventional single mode EVT without an input grounding device, the first electric motor would typically need to provide reaction torque to hold the engine at zero speed while the second electric motor would provide driving torque. Here, the controlled clutch brake can selectively ground input member 22 to provide such reaction torque.

The ability to use both e-motors 46, 50 to provide driving torque in both forward and reverse directions via the controlled clutch brake 34 can provide additional advantages with regard to launching the vehicle from a stop. This can be particularly advantageous when launching the vehicle while positioned on a grade, such as a 30 percent grade, where more torque is required than on a level road surface. In this scenario, those skilled in the art will appreciate that a conventional single mode EVT without an input brake typically cannot generate enough drive torque from the one of the two electric motors that serves as the traction motor, especially since a reserve is typically necessary to protect for starting the associated engine.

Moreover, with controlled clutch brake 34 grounding input shaft 22 and thus engine 14, the torque or load can be split among or between e-motors 46, 50 thereby providing for improved operational efficiencies and reduced operating temperatures of e-motors 46, 50. The controlled clutch brake 34 can also provide improved drive and regenerative braking efficiency of EVT 10 by reducing total system loss by minimizing the sum of the e-motors 46, 50 and engine 14 losses. With the enhanced EVT 10 disclosed herein, the controlled clutch brake 34 can be used to simplify the on-to-off transition of engine 14, since the controlled clutch brake 34 can be operated in a controlled slip manner so as to apply a torque directly to the engine 14 to slow it down at a desired rate. Using controlled clutch brake 34, first e-motor 46 is not required to provide reaction torque and can thus also assist in braking. This is in contrast to a conventional single mode EVT without an input brake, where when the vehicle speed is at a low enough level, an engine can be shut off and further deceleration can be accomplished using the larger of the electric motors as the primary braking motor and the first of the electric motors to provide reaction torque.

With additional reference to FIGS. 4A and 4B, EVT 10 is shown in two exemplary operating conditions configured to provide forward propulsion for an associated vehicle. In the particular examples illustrated, the controlled clutch brake 34 is depicted as open in FIG. 4A and the controlled clutch brake 34 is depicted as closed in FIG. 4B. Those skilled in the art will readily recognize the application of EVT 10 in lever diagram form shown in FIGS. 4A and 4B to the schematic illustrations in FIG. 1 and FIGS. 2-3.

Briefly, however, and with continued reference to FIG. 1 as an example, the first or power split planetary gear set 38 is represented by a first lever 150, the second or reduction planetary gear set 42 is represented by a second lever 154, the transfer gear arrangement 54 is represented by a third lever 158 and the final drive 18 is represented by a fourth lever 162. The first lever 150 includes first, second and third nodes A, B, C corresponding to the first sun gear member 60, the first ring gear member 64 and the first carrier member 68, respectively. The second lever 154 includes nodes D, E, F corresponding to second sun gear member 78, the second ring gear member 82 and the second carrier member 84, respectively. The first ring gear member 64 and the second carrier member 84 are coupled to each other by interconnecting member 106, which is coupled to the transfer gear arrangement 54 at node G of third lever 158. The transfer gear arrangement 54 represented by third lever 158 is coupled to the final drive 18 at node H of fourth lever 162.

The lever diagrams of FIGS. 4A and 4B are shown illustrating an exemplary operating condition of EVT 10 corresponding to forward motion of the associated vehicle. In FIG. 4A, the controlled clutch brake 34 is open allowing the input member 22 and the engine 14 to rotate and provide propulsion assistance. In this particular example, the engine 14 is providing drive torque to assist in the forward motion of the vehicle, which results in the first e-motor 46 spinning in the positive direction (same direction as the engine) and the second e-motor 50 spinning in an opposite, negative direction. It will be appreciated to those skilled in the art that the arrows illustrated relative to the various nodes represent speed in a positive direction (to the right of the respective zero-point reference when looking at the figure) and in a negative direction (to the left of the respective zero-point reference when looking at the figure).

With particular reference to FIG. 4B, input member 22 is shown grounded by controlled clutch brake 34, which in turn grounds engine 14 and first carrier member 68. In this operating condition, EVT 10 is enabled to provide drive torque from both e-motors 46, 50. Here, both e-motors 46, 50 rotate or spin in the negative direction to propel the vehicle in the forward direction, as can be seen by the speed arrows for e-motor 46, 50 associated with the respective sun gear members 60, 78 at nodes A and D.

Those skilled in the art will readily appreciate that the lever diagrams of FIGS. 4A and 4B can be utilized to illustrate various operational conditions of EVT 10. For example, consider an operating condition of reverse propulsion provided by EVT 10 using both e-motors 46, 50. In this example, each of the first through fourth levers 150, 154, 158, 162 can be reversed about their respective pivot and/or grounding points thereby representing a negative wheel speed at the final drive 18 using the above-referenced speed indication convention.

Figure 2:
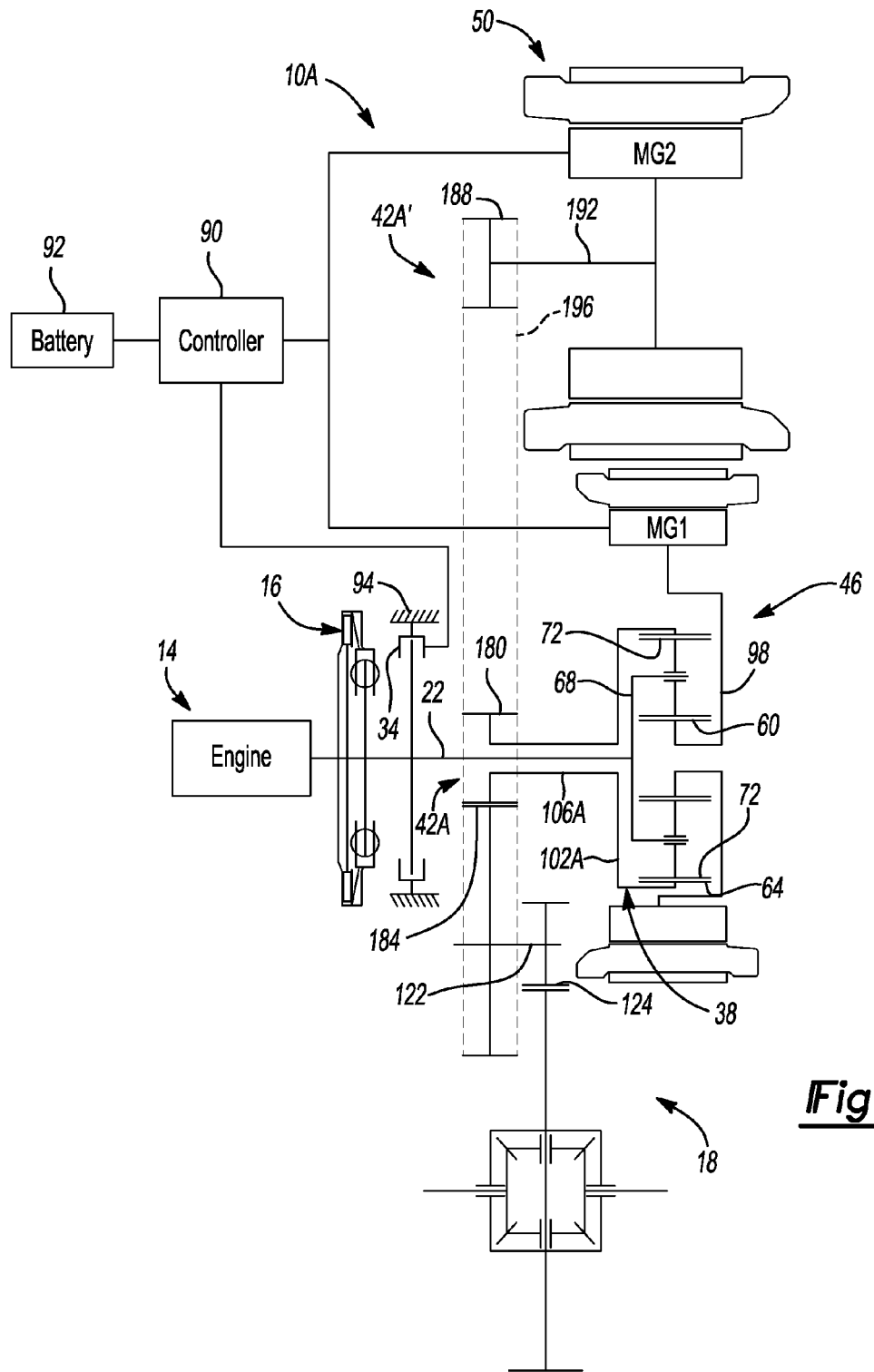
FIG. 2 is a schematic illustration of another exemplary electrically variable transmission coupled to the engine and having the selectively engagable torque transmitting device according to the principles of the present disclosure.

With additional reference to FIG. 2, a second exemplary EVT 10A is shown where like reference numerals refer to like or corresponding parts and/or features. EVT 10A can be similar to EVT 10 such that only differences will be discussed in detail. In this regard, EVT 10A can include alternative gear reduction and transfer arrangements 42A and 42A' for first e-motor 46 and second e-motor 50, respectively. EVT 10A can include input member 22 extending through a layshaft 106A that non-rotatably couples first ring gear member 64 to a first gear 180 of gear reduction and transfer arrangement 42A via bell portion 106A. The first gear 180 can be concentric with input member 22 and layshaft 106A, as shown in FIG. 2.

Gear reduction and transfer arrangement 42A can provide for both gear reduction and transfer for first e-motor 46 and can include the first gear 180 and a second transfer and reduction gear 184. The first gear 180 can be non-rotatably coupled to the first ring gear 64 as discussed above and can be in continuous meshing engagement with the second gear 184. In one exemplary implementation, first gear 180 can be directly coupled to first ring gear 64 via layshaft 106A Gear reduction and transfer arrangement 42A' can include a first gear 188 and the second transfer and reduction gear 184 discussed above. In the exemplary configuration shown in FIG. 2, the first and second e-motors 46, 50 can each use the common transfer and reduction gear 184. The first gear 188 can be non-rotatably coupled to the second e-motor 50 for common rotation therewith via a layshaft 192. In one exemplary implementation, the first gear 188 can be directly coupled to the layshaft 192. The first gear 188 can be in continuous meshing engagement with transfer and reduction gear 184, as indicated in FIG. 2 by the phantom lines 196. In this regard, it should be appreciated that second e-motor 50 and associated layshaft 192 and gear 188 can be positioned behind gear 184 from the perspective of a plan view of FIG. 2 such that gear 188 is in continuous meshing engagement with gear 184, but are shown for purposes of clarity of illustration only as being positioned above first e-motor 46. The second transfer and reduction gear 184 can be non-rotatably coupled to final drive gear 124 for common rotation therewith via transfer shaft 122.

As can be seen by a comparison of the schematic illustrations of EVT 10 shown in FIG. 1 and EVT 10A shown in FIG. 2, different gear reduction and transfer gear arrangement configurations can provide for, among other advantages, flexibility in configuring an overall size and shape of the EVT. Such flexibility can be useful, for example, when different packaging constraints are presented for incorporation of an EVT into a vehicle. In the exemplary configuration of EVT 10A shown in FIG. 2, the first and second e-motors 46, 50 can share a common reduction gear 184 and both transfer and gear reduction arrangements can be positioned between the engine 14 and at least the first e-motor 46 and planetary gear set 38.

Figure 3:
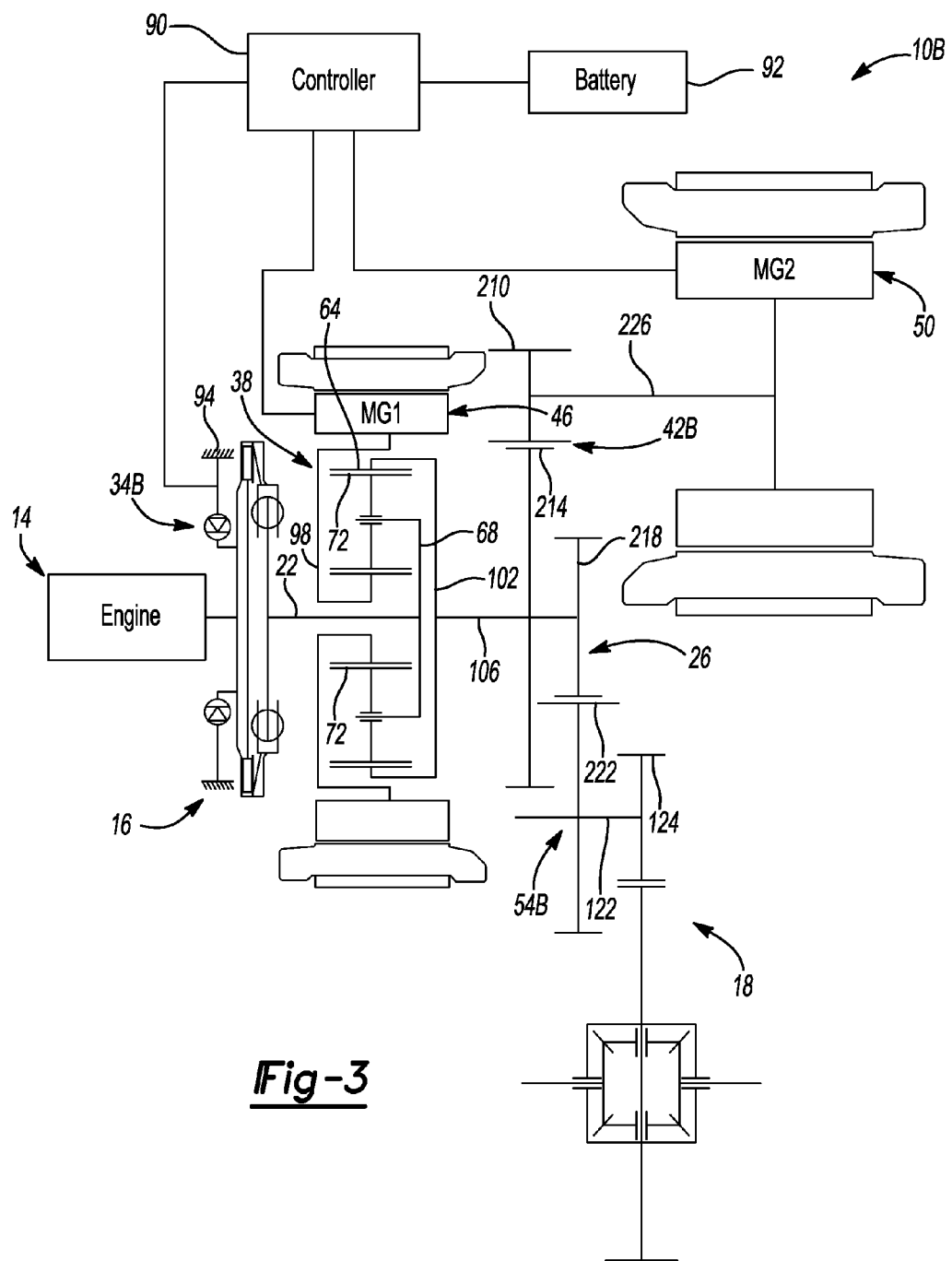
FIG. 3 is a schematic illustration of another exemplary electrically variable transmission coupled to an engine and having an alternative selectively engagable torque transmitting device according to the principles of the present disclosure.

Turning now to FIG. 3 and with continued reference to FIGS. 1 and 4, another example of an EVT is generally indicated at 10B. The EVT 10B can also be similar to EVT 10 such that only differences will be discussed in detail. EVT 10B can include the same or substantially similar power split configuration (e.g., first planetary gear set 38) as EVT 10 while incorporating an alternative transfer gear arrangement 54B, a one-way clutch 34B in place of controlled clutch brake 34, and an alternative gear reduction arrangement 42B in place of second planetary gear set 42 of EVT 10.

The one-way clutch 34B can be provided in various forms, such as an over-running clutch or a mechanical diode one-way clutch, and can be packaged or provided up stream of the torsional vibration damper 16. For example, the mechanical diode one-way clutch 34B can be integrated into the torsional vibration damper 16 or be provided as part of engine 14, such as at the end of a crankshaft of the engine 14.

Such a configuration can provide packaging advantages, such as a more compact EVT design. The mechanical diode one-way clutch 34B can also provide a faster response, such as during actuation, than a conventional friction clutch that requires a certain amount of time to, for example, open the clutch. This faster response can be beneficial, for example, during operating conditions where the engine 14 is to be started. It should be appreciated, however, that while the mechanical diode one-way clutch is shown packaged upstream of the torsional vibration damper, the mechanical diode clutch can be packaged in various other locations relative to engine 14, torsional vibration damper 16 and input member 22.

Continuing with reference to FIG. 3, the bell portion 102 associated with first ring gear member 64 can be connected to the gear reduction and transfer arrangements 42B, 52B via layshaft 106. Gear reduction arrangement 42B can include, in the exemplary configuration shown, first and second gears 210 and 214. The first gear 210 can be non-rotatably connected to second e-motor 50 for common rotation therewith via a layshaft or connecting member 226 similar to EVT 10A discussed above with reference to FIG. 2. The second reduction gear 214 can be non-rotatably coupled to the layshaft 106 for common rotation therewith and can be in continuous meshing engagement with first gear 210.

The transfer gear arrangement 54B can include an output gear 218 and a transfer gear 222. The output gear 218 can also be non-rotatably coupled to the layshaft 106 as discussed above and can be in continuous meshing engagement with the transfer gear 222. The transfer shaft 122 can non-rotatably connect the transfer gear 222 to the final drive gear 124 for common rotation therewith.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electrically variable transmission, comprising:
an input member and a stationary member;
a first motor-generator and a second motor-generator;
a gear reduction arrangement including at least a first gear member coupled to at least one second gear member, the first gear member coupled to the second motor-generator for common rotation therewith;
a first planetary gear set having a first sun gear member, a first ring gear member and a first carrier member rotatably supporting a plurality of pinion gears in meshing engagement with the first sun gear member and the first ring gear member, the first sun gear member coupled to the first motor-generator for common rotation therewith, the first carrier member coupled to the input member for common rotation therewith, and the first ring gear member coupled to the at least one second gear member of the gear reduction arrangement; and
a torque transmitting device configured to selectively fix or ground rotation of the input member to the stationary member in at least one of a first rotational direction and a second opposite rotational direction;
wherein the gear reduction arrangement includes a second planetary gear set having the first sear member as a second sun sear member the at least one second gear member as a second plurality of pinion gear members, a second ring gear member, and a second carrier member rotatably supporting the second plurality of pinion gear members in meshing engagement with the second ring gear member and the second sun gear member, and wherein the second ring gear member is rotationally fixed to ground and the second carrier member is coupled to the first ring gear member for common rotation therewith.

2. The transmission of claim 1, wherein the torque transmitting device includes a selectively engagable clutch brake configured to ground the input member to the stationary member.

3. The transmission of claim 1, wherein the second carrier member is connected to the first ring gear member with a layshaft and the transmission further comprises an output member non-rotatably coupled to the layshaft.

4. The transmission of claim 3, wherein the clutch brake is positioned on a first side of the first motor-generator and planetary gear set and the output member is positioned about a second opposite side between the first motor-generator and planetary gear set and the second motor-generator and planetary gear set.

5. The transmission of claim 3, further comprising an electric drive mode, and wherein when the clutch brake is selectively engaged such that the input member is grounded, the first motor-generator provides driving torque to assist the second motor-generator in the electric drive mode.

6. The transmission of claim 5, wherein the transmission includes only a single clutch brake.

7. The transmission of claim 3, wherein when the clutch brake is selectively engaged such that the input member is grounded, the first motor-generator functions as a generator to aid the second motor-generator with regenerative braking.

8. The transmission of claim 7, wherein the clutch brake includes a friction clutch that can be selectively slipped to slow down rotation of a prime mover adapted to be coupled to the input member before grounding the input member.

9. The transmission of claim 1, wherein the torque transmitting device comprises a one-way clutch.

10. The transmission of claim 1, wherein the torque transmitting device comprises a mechanical diode one-way clutch.

11. An electrically variable transmission, comprising:
an input member;
a first motor-generator and a second motor-generator;
a gear reduction arrangement including at least a first gear member coupled to at least one second gear member, the first gear member coupled to the second motor-generator for common rotation therewith;
a first planetary gear set having a first sun gear member, a first ring gear member and a first carrier member rotatably supporting a plurality of pinion gears in meshing engagement with the first sun gear member and the first ring gear member, the first sun gear member coupled to the first motor-generator for common rotation therewith, the first carrier member coupled to the input member for common rotation therewith, and the first ring gear member coupled to the at least one second gear member of the gear reduction arrangement;

a torque transmitting device configured to selectively fix or ground rotation of the input member in at least one of a first rotational direction and a second opposite rotational direction;
first and second layshafts; and
an output coupled to the second layshaft for common rotation therewith, the first electric motor-generator, the first planetary gear set, the second gear member and the output having a common rotational axis;
wherein the first gear member of the gear reduction arrangement is directly coupled to the second motor-generator with the first layshaft and the second gear member of the gear reduction arrangement is directly coupled to the first ring gear with the second layshaft, the first and second gear members being in constant meshing engagement.

12. An electrically variable transmission, comprising:
an input member;
a first motor-generator and a second motor-generator;
a first planetary gear set having a first sun gear member, a first ring gear member and a first carrier member rotatably supporting a plurality of pinion gears in meshing engagement with the first sun gear member and the first ring gear member, the first sun gear member coupled to the first motor-generator for common rotation therewith and the first carrier member coupled to the input member for common rotation therewith;
a second planetary gear set having a second sun gear member, a second ring gear member and a second carrier member rotatably supporting a plurality of pinion gears in meshing engagement with the second sun gear member and the second ring gear member, the second sun gear member coupled to the second motor-generator for common rotation therewith, the second carrier member coupled to the first ring gear member for common rotation therewith and the second ring gear grounded to a stationary member; and
a torque transmitting device configured to selectively ground the input member to a stationary member thereby selectively providing reaction torque to the first motor-generator.

13. The transmission of claim 12, wherein the transmission includes only a single torque transmitting device in the form of a clutch brake, the clutch brake, when actuated to ground the input, providing reaction torque to the first motor-generator such that the first motor-generator aids the second motor-generator in providing drive torque in electric drive mode in both forward and reverse propulsion modes.

14. The transmission of claim 13, wherein the first motor-generator functions as a generator to aid the second motor-generator with regenerative braking when the clutch brake is engaged.

15. The transmission of claim 14, wherein the clutch brake includes a friction clutch that can be selectively slipped to slow down rotation of a prime mover adapted to be coupled to the input member before grounding the input member.

\* \* \* \* \*